3,404,080
CABLES AND PROCESS FOR PRODUCING ELECTRICAL INSULATION THEREFOR

Glenn S. Peacock, Somerville, N.J., assignor to Union Carbide Corporation, a corporation of New York
No Drawing. Filed May 18, 1965, Ser. No. 456,833
13 Claims. (Cl. 204—181)

This invention relates to cables having outer sheaths and more particularly to polymer coated sheaths.

Various types of cables including telephone, power, and coaxial cables have outer conductor or protective sheaths commonly made of aluminum, copper or steel. These sheaths in turn are covered with an outermost jacket which serves both to insulate and protect the sheath. Polymeric materials such as polyolefins and particularly polyethylene have been used for this purpose. The adhesion of polyolefin jackets to these sheaths has not been satisfactory as demonstrated during both aerial installation and burial installation of these cables. Either the polyolefin jacket bunches into shoulders as the cables are pulled over elevated cross arms, dragged through trenches or plowed into trenches or they adhere so tenaciously that they cannot be stripped from the sheath to make connections in the field or during pulling, the outer polyolefin jacket is stretched and made longer than the sheathing.

It has now been discovered that sheathed cables covered with continuous olefin polymer jackets which firmly adhere to but can be stripped from the sheathing can be fabricated by first (a) electrodepositing a carboxyl containing α-olefin polymer onto an anodic cable sheathing from an aqueous bath containing an admixture of water and a salt of a carboxyl containing α-olefin polymer having monovalent cations and then (b) applying a polyolefin jacket to the electrodeposited coating.

Steps involved in one method of practicing this invention include:

(1) Contacting the anodic cable sheathing with a bath comprising an admixture of water and a salt of a carboxyl-containing α-olefin polymer having monovalent cations;

(2) Connecting a cathode in electrical contact with said water-salt bath;

(3) Connecting a direct current source in an electrical circuit containing the anodic cable sheathing, cathode, and water-salt bath;

(4) Applying a voltage of at least 5 volts D.C. for a length of time sufficient to effect electrodeposition of carboxyl containing α-olefin polymer;

(5) Drying the electrodeposited carboxyl containing α-olefin polymer; and (6) Coating the electrodeposited carboxyl-containing α-olefin polymer with an olefin polymer.

Although not essential, it is preferred to employ as the carboxyl containing α-olefin polymers of this invention interpolymers of α-olefins having the general formula:

$$R\text{---}CH=CH_2$$

where R is selected from the group consisting of hydrogen and alkyl radicals having up to 10 carbon atoms, the olefin content of said interpolymer being at least 50 mole percent of the total interpolymer and interpolymerized therewith an α,β-ethylenically unsaturated carboxylic acid having one or more carboxyl groups, said unsaturated carboxylic acid constituting up to about 50 mole percent of the total interpolymer.

However, the present invention is not limited to interpolymers derived from the interpolymerization of an α-olefin and an α,β-ethylenically unsaturated carboxylic acid. The starting polymer used to make the polymer salts used in this invention can also be provided by oxidizing olefinic polymers, such as those described in U.S. 3,155,644, by grafting carboxylic acid containing monomers onto an olefin polymer backbone by methods well known in the graft polymerization art such as the method described in U.S. 2,970,129 which are incorporated herein by reference or by grafting monomers such as carboxylic acid derivatives, i.e., esters, anhydrides, amides, nitriles and the like onto an olefin polymer backbone followed by conversion to free carboxylic acid groups after grafting.

Also included within the purview of this invention are halogenated, carboxyl containing α-olefin polymers. The method of introducing the halogen into these polymers is not at all critical and so can be accomplished by first preparing a halogen free interpolymer of, for example, ethylene-acrylic acid and then halogenating that interpolymer by methods well known in the art or by interpolymerizing a halogen containing vinyl monomer with an α-olefin and an unsaturated carboxylic acid. A specific example of this latter class of interpolymers is one obtained by interpolymerizing ethylene, vinyl chloride and acrylic acid. Other examples include interpolymers of ethylene-vinylidene chloride-acrylic acid, ethylene-vinyl chloride-methacrylic acid, ethylene-vinylidene chloride-methacrylic acid, ethylene-vinyl bromide-acrylic acid, ethylene-vinyl bromide-methacrylic acid, ethylene-vinyl fluoride-acrylic acid, ethylene-vinyl fluoride-methacrylic acid, ethylene-vinylidene fluoride-acrylic acid, ethylene-vinylidene fluoride-methacrylic acid, ethylene-vinyl iodide-acrylic acid, propylene-vinyl chloride-acrylic acid, propylene-vinyl chloride-methacrylic acid, propylene-vinylidene chloride-acrylic acid, propylene-vinylidene chloride-methacrylic acid and the like.

As indicated above, the α-olefins preferably employed in the polymers of this invention are α-olefins having the general formula:

$$RCH=CH_2$$

where R is either a hydrogen or an alkyl radical having up to 10 carbon atoms. Thus, suitable α-alpha olefins include, ethylene, propylene, butene-1, pentene-1, hexene-1, neohexene, octene-1, nonene-1, decene-1, 3-methylbutene-1, 4-methylpentene-1, 3-methylhexene-1, 4,4-dimethylhexene-1 and the like. Although polymers of higher olefins can be used, they are not as commercially available or economical as the lower olefins.

The α,β-ethylenically unsaturated carboxylic acids used in the polymers of this invention preferably have 3 to 8 carbon atoms, although those having a greater number of carbon atoms can also be used, if desired. Specific examples include: acrylic acid, methacrylic acid, ethacrylic acid, itaconic acid, maleic acid, fumaric acid, and half esters of the above dicarboxylic acids such as, methyl hydrogen maleate, methyl hydrogen fumarate, ethyl hydrogen maleate, ethyl hydrogen fumarate and the like.

The starting polymers used to make the polymer salts of this invention are not limited to two components. Therefore, additional copolymerizable monomers can be employed together with the olefin and carboxylic acid comonomers. The scope of the starting polymers which can be used is exemplified, although not limited by the following interpolymers: ethylene/acrylic acid interpolymers, ethylene methacrylic acid interpolymers, ethylene/itaconic acid interpolymers, ethylene/methyl hydrogen maleate interpolymers, ethylene/maleic acid interpolymers, ethylene/acrylic acid/methyl acrylate interpolymers, ethylene/acrylic acid/ethyl acrylate interpolymers, ethylene/methacrylic acid/methyl methacrylate interpolymers, ethylene/methacrylic acid/ethyl methacrylate interpolymers, ethylene/acrylic acid/methacrylic acrylic acid interpolymers, ethylene/methacrylic acid/methyl acrylate interpolymers, ethylene/acrylic acid/methyl methacrylate interpolymers, ethylene/methyl hydrogen maleate/ethyl acrylate interpolymers, ethylene/acrylic acid/vinyl acetate, ethylene/methacrylic acid/vinyl acetate interpolymers, ethylene/propylene/acrylic acid interpolymers, ethylene/propylene/methacrylic acid interpolymers, ethylene/maleic acid/ethyl vinyl ether interpolymers, ethylene/butene-1/acrylic acid interpolymers, ethylene/neohexene/acrylic acid interpolymers, propylene/acrylic acid interpolymers, butene-1/acrylic acid interpolymers and the like.

The polymer salts used in this invention need not be limited to 2 components, i.e., one α-olefin and one unsaturated carboxylic acid salt moiety. Even when the starting polymer is composed of only 2 components, viz., one α-olefin and one unsaturated carboxylic acid, the resultant salt can have 3 or more components. To cite a concrete case in point, an ethylene/acrylic acid interpolymer can be partly neutralized with sodium hydroxide to afford an interpolymer salt consisting of 3 components, viz., ethylene, acrylic acid, and sodium acrylate mers. It will be readily apparent to those skilled in the art that polymer salts containing innumerable combinations of α-olefins and unsaturated carboxylic acids, salts and acid derivatives are contemplated within the purview of this invention.

The carboxyl content of the starting olefin polymer is preferably in the range of about 5 to 25 mole percent of the total polymer although contents of about 1 to 50 mole percent can also be employed, if desired. The starting olefin polymer used to make polymer carboxyl salts in this invention should contain sufficient carboxyl groups to permit the formation of at least water-dispersible salts and preferably water-soluble salts. Solubility increases as the carboxyl salt moiety content of the polymer is increased.

The carboxyl salt moiety content of these polymer salts is preferably about 3 to 25 mole percent of the total polymer salt although other ranges can also be employed, if desired. The term "carboxyl salt moiety" includes both the carboxyl anion and the monovalent cation.

The preferred monovalent cations in the polymer salts of this invention are Na+, K+, Li+ and (R)$_3$NH+ wherein each of R is hydrogen or a monovalent hydrocarbon radical containing up to 10 carbon atoms.

The hydrocarbon radical can be an alkyl, cycloalkyl, aryl, alkaryl or aralkyl radical. Suitable alkyl radicals include methyl, ethyl and isopropyl radicals. Representative cycloalkyl radicals include cyclobutyl, cyclopentyl and cyclohexyl radicals. Representative aryl radicals include phenyl and naphthyl radicals. Among the alkaryl and aralkyl radicals which can be used are benzyl, cumyl, tolyl and xylyl radicals.

These polymer carboxyl salts can be prepared by neutralizing the starting carboxyl containing polymer with metal salts, such as carbonates or bicarbonates, metal bases such as hydroxides or alkoxides, amine bases such as trimethylamine, dimethylphenyl amine and the like, methyl alkyls such as sodium ethyl, butyl lithium and the like, metal aryls such as phenyl lithium, potassium naphthalene and the like, hydrides of sodium potassium or lithium, amides of sodium or potassium, oxides such as sodium peroxide, or in the case of alkali metal salts even with the free alkali metal itself. Preferred bases are alkyl ammonium hydroxides, ammonium hydroxide, lithium hydroxide, sodium hydroxide and potassium hydroxide. Any method known in the art can be used to effect this neutralization process. It has been found to be convenient and economical to blend the starting carboxyl containing olefin polymer and a metal base or an aqeous solution thereof on a two-roll mill, in a Banbury mixer or with similar commercially available mixing equipment.

The concentration of polymer salt in the water-salt bath is not narrowly critical. A preferred range is about 5.0 to 40% solids by weight with about 5% to 20% being particularly preferred. It is preferred to apply the direct current for at least 0.01 second in this method.

The temperature and pressure used are not critical and so for convenience ambient conditions are preferred, although higher and lower conditions can be used if desired. The electrodeposition step can be carried out batch-wise or continuously.

Any available source of direct current can be used in the practice of this invention such as a motor-generator unit, batteries, rectified alternating current and the like. It was found convenient to employ direct current obtained by the full-wave rectification of a variable autotransformer controlled 115 volt alternating current, filtered to low residual ripple by well-known impedance-capacitance arrangements. It is preferred to use a direct current of at least 5 volts D.C. There is no maximum voltage other than that imposed by the heat generated in the salt bath and the efficiency of heat transfer in the system used and the breakdown voltage of the applied film.

The preferred anodic sheathing materials used in this invention are aluminum, copper and steel and their commercially available alloys although other electrically conductive metals can be used if desired.

The cathode should, of course, also be electroconductive and its composition is not critical although it preferably should be inert under the reaction conditions used in the electrodeposition process. Several materials which are suitable include lead, stainless steel, carbon, graphite, tin, platinum, rhodium and the like. The cathode may be used as a simple electrode immersed in the water-salt bath or may be constructed to serve as the cell to contain the bath, or may be in electrical contact with the bath via an ionically permeable membrane, e.g., salt bridge porous plate combination or ionically permeable membrane, without literally touching the bath.

The term "olefin polymer" is used in the present specification and claims to denote normally solid homopolymers of olefinically unsaturated hydrocarbons as well as normally solid copolymers thereof. Preferred olefin polymers in this invention contain at least 10 percent by weight of a combined mono-olefinically unsaturated hydrocarbon having from 2 to 4 carbon atoms inclusive, i.e., butene-1, propylene and ethylene. Ethylene polymers are especially preferred as the olefin polymer used in the composition of this invention.

The ethylene polymer preferred in the composition should desirably be a grade suitable for extrusion coating having a density of about 0.88 to 0.94. However, this selection is not critical and other grades of ethylene polymer, including high density polyethylene, may also be used as well as copolymers of ethylene combined with one or more other organic compounds copolymerizable therewith which contain polymer mono-olefins such as propylene, butenes, pentenes, hexenes, heptenes, octenes, dodecenes, octadecenes and the like; diolefins such as butadiene, isoprene, chloroprene, hexadiene, octadiene, decadiene and the like; acetylene; other olefinically unsaturated comonomers such as vinyl formate, vinyl acetate, vinyl propionate, vinyl butyrate, vinyl 2,4-dimethylpentoate, vinyl pelargonate, vinyl stearate, vinyl pivalate, vinyl tert-butyl acetate, vinyl benzoate, vinyl diethylacetate, vinyl beta, gamma-dimethyl valerate, vinyl thioacetate, vinyl alcohol, styrene, methylstyrenes, chlorostyrenes, alkyl monoesters of 2-butene-1,4-dioic acid, diallyl oxalate, diallyl sebacate, methallyl alcohol, allyl alcohol, maleic anhydride, diethyl maleate, diethyl fumarate, diethyl citraconate, 9-methylenefluorene, beta-methylene-beta-propiolactone, vinyl isocoumarans such as 1,1,3,3-tetramethyl-4-vinylisocoumaran, 1,2-alkylene oxides, N-n-butylmaleimide, N-isobutylmaleimide, N-vinylphthalimide, N-methyl-N-vinylacetamide, vinyl triethoxysilane, bicycloheptene, bicycloheptadiene, divinyl phosphonate, N-vinylcarbazole, methyl acrylate, ethyl acrylate, butyl acrylate, n-octyl acrylate, 2-ethylhexyl acrylate, decyl acrylate, lauryl acrylate, hexadecyl acrylate, octadecyl acrylate, methyl methacrylate, ethyl methacrylate, butyl methacrylate, octyl methacrylate, 2-ethylhexyl methacrylate, decyl methacrylate, lauryl methacrylate, tetradecyl methacrylate, hexadecyl methacrylate, octadecyl methacrylate, acrylic acid, methacrylic acid, methyl vinyl ether, ethyl vinyl ether, n-butyl vinyl ether, isobutyl vinyl ether, t-butyl vinyl ether, divinyl ether, vinyl methyl ketone, vinyl ethyl ketone, vinyl butyl ketone, terpenes, bicyclo(2.2.1)-2-heptenes, stilbene, limonene, dichloroethylene, vinyl chloride, vinyl fluoride, vinylidene chloride, vinylidene fluoride and the like; and miscellaneous compounds such as carbon monoxide, formaldehyde, sulfur dioxide and the like.

The olefin polymer outer jacket can be applied by any of several known techniques such as extrusion coating, solvent dip coating, film lamination, powder application from fluidized bed, electrostatic or flame spray, by pressure in a hydraulic press and by other like methods.

The present invention is particularly useful in fabricating telephone cables having an aluminum, copper or steel sheath and a polyethylene outer jacket.

This invention is also applicable to cables having an outer polymer jacket of chlorosulfonated polyethylene, neoprene, Thiokol, butyl rubber, natural rubber, polyvinyl fluoride, polyvinylidene fluoride and the like instead of the olefin polymers previously described.

The invention is further described by the examples which follow wherein all parts and percentages are by weight unless otherwise specified.

EXAMPLES 1–6

A steel tank 6″ x 2″ x 4″ was used to confine a 20% aqueous solution of an ethylene/acrylic acid/sodium acrylate interpolymer which had previously been prepared by neutralizing 90% of an 82/18 ethylene/acrylic acid interpolymer having a melt index (ASTM D–1238–57T) of 200. The steel tank was then connected to the negative lead of a variable D.C. source. Strips of aluminum 2″ x 4″ were connected to the positive lead of the same variable D.C. source and immersed in the aqueous interpolymer salt solution. The circuit was closed in several separate experiments using applied voltages of 50, 100, 150, 200, 225 and 250 volts for 60 seconds. The aluminum specimens coated with electrodeposited carboxyl-containing ethylene polymer were air dried and placed in a hydraulic press overlaid with strips of molten polyethylene (density=0.92, melt index=0.1). The press was closed at a pressure of about 100 p.s.i.g. for 30 seconds. The press was then opened and the resultant laminates of aluminum, carboxyl-containing ethylene polymer and polyethylene chilled in cold water. The adhesion of the polyethylene to the aluminum coated with electrodeposited polymer was determined empirically by delaminating the polyethylene by hand. Complete resistance to stripping by hand was designated by a value of 10. Spontaneous delamination was designated by a value of 0. The results are presented in Table 1, together with a control in which aluminum having no electrodeposited polymer thereon was laminated to polyethylene.

TABLE 1

| Example No. | Applied D.C. voltage, volts | Adhesion value [1] |
|---|---|---|
| 1 | 10 | 5 |
| 2 | 15 | 6 |
| 3 | 25 | 9 |
| 4 | 75 | 9 |
| 5 | 150 | 10 |
| 6 | 250 | 4 |
| Control | | 1 |

[1] 10 = could not be delaminated by hand, 0 = spontaneous delamination.

EXAMPLES 7–11

The procedure described in Example 1–6 was used with cold rolled steel as the anode. The results thus obtained are presented in Table 2, together with the results obtained with a control which had no electrodeposited polymer thereon.

TABLE 2

| Example No. | Applied D.C. voltage, volts | Adhesion value [1] |
|---|---|---|
| 7 | 50 | 6 |
| 8 | 100 | 6 |
| 9 | 150 | 7 |
| 10 | 225 | 6 |
| 11 | 250 | 5 |
| Control | | 3 |

[1] 10 = could not be delaminated by hand, 0 = spontaneous delamination.

EXAMPLES 12–48

When the experiments described in Examples 1–6 are repeated but with ethylene-acrylic acid or ethylene-methacrylic acid interpolymer salts containing lithium, potassium or ammonium cations instead of sodium cations, similar results are obtained.

EXAMPLES 49–54

The procedure described in Examples 1–6 was used with copper anodes at voltages in the range of about 150 to 250 volts D.C. The adhesion of the electrodeposited polymer to the copper anodes was excellent.

EXAMPLES 55–70

Complete telephone cables can be assembled by wrapping a core consisting of bundles of wire singles with laminates of aluminum, steel or copper containing electrodeposited carboxyl-containing ethylene polymer and then subsequently coating with an outer jacket of polyethylene. To facilitate connections in the field a sharp edge or conventional wire stripping tool can be used to remove substantially all of the outer olefin polymer from the aluminum surface.

The electrodeposition and coating operations can be readily performed continuously in an in-line or tandem operation.

Although this invention has been described with a certain amount of particularity in its preferred forms, it is understood that the present disclosure has been made only by way of example, and that numerous changes can be made without departing from the spirit and scope of the invention.

What is claimed is:

1. Method of making improved sheathed cables which comprises:
   (a) electrodepositing a carboxyl-containing α-olefin polymer onto an anodic cable sheathing; and
   (b) applying a polyolefin outer jacket to the electrodeposited polymer.

2. Method claimed in claim 1 wherein the electrodeposition step is effected by:
   (1) contacting the anodic cable sheathing with a bath comprising an admixture of water and a salt of a carboxyl-containing α-olefin polymer having monovalent cations;
   (2) connecting a cathode in electrical contact with said water-salt bath;
   (3) connecting a direct current source in an electrical circuit containing the anodic cable sheathing, cathode, and water-salt bath;
   (4) applying a voltage of at least 5 volts D.C. for a length of time sufficient to effect electrodeposition of carboxyl-containing α-olefin polymer; and
   (5) drying the electrodeposited carboxyl-containing α-olefin polymer.

3. Method claimed in claim 1 wherein the α-olefin is ethylene.

4. Method claimed in claim 1 wherein the carboxyl-containing α-olefin polymer salt contains up to 25 mole percent of an α,β-ethylenically unsaturated carboxylic acid having at least one carboxyl group.

5. Method claimed in claim 4 wherein the ethylenically unsaturated carboxylic acid is acrylic acid and the acrylic acid anions plus the cations comprise about 10 to 25 mole percent of the total olefin polymer salt.

6. Method claimed in claim 2 wherein the monovalent cations are $Na^+$ cations.

7. Method claimed in claim 2 wherein the monovalent cations are $K^+$ cations.

8. Method claimed in claim 2 wherein the monovalent cations are $Li^+$ cations.

9. Method claimed in claim 2 wherein the monovalent cations are $(R)_3NH^+$ cations and each of R is selected from the group consisting of hydrogen and monovalent hydrocarbon radicals having up to 10 carbon atoms inclusive.

10. Method claimed in claim 1 wherein the anodic cable sheathing is aluminum.

11. Method claimed in claim 1 wherein the anodic cable sheathing is steel.

12. Method claimed in claim 1 wherein the anodic cable sheathing is copper.

13. Sheathed cable article comprising a core of wire singles, an electroconductive metal sheathing around said core, an electrodeposited coating of carboxyl-containing α-olefin polymer on said sheathing, and an outer jacket of an olefin polymer around said coated sheathing.

References Cited

UNITED STATES PATENTS

| | | | |
|---|---|---|---|
| 2,478,322 | 8/1949 | Robinson et al. | 204—181 |
| 3,093,511 | 6/1963 | Weisel et al. | 117—232 |

HOWARD S. WILLIAMS, *Primary Examiner.*